(12) United States Patent
Klofta et al.

(10) Patent No.: US 8,685,309 B2
(45) Date of Patent: *Apr. 1, 2014

(54) METHOD FOR MAKING A PERSONAL CARE PRODUCT

(75) Inventors: Thomas James Klofta, Cincinnati, OH (US); Gary Dean Lavon, Liberty Township, OH (US); Thomas Edward Schulte, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 731 days.

This patent is subject to a terminal disclaimer.

(21) Appl. No.: 12/767,283

(22) Filed: Apr. 26, 2010

(65) Prior Publication Data

US 2011/0260369 A1 Oct. 27, 2011

(51) Int. Cl.
*B29C 49/08* (2006.01)
*B29C 49/22* (2006.01)
*B29C 49/64* (2006.01)

(52) U.S. Cl.
USPC ............................ 264/458; 264/512; 264/524

(58) Field of Classification Search
USPC .................................. 264/512, 458, 524, 525
See application file for complete search history.

(56) References Cited

U.S. PATENT DOCUMENTS

| | | |
|---|---|---|
| 2,843,522 A | 7/1958 | Mahon |
| 3,770,648 A | 11/1973 | Mackles |
| 3,935,862 A | 2/1976 | Kraskin |
| 4,034,077 A | 7/1977 | Hill et al. |
| 4,196,218 A | 4/1980 | Thiele |
| 4,273,786 A | 6/1981 | Kraskin |
| 4,278,658 A | 7/1981 | Hooper et al. |
| 4,329,366 A | 5/1982 | Nashed et al. |
| 4,389,418 A | 6/1983 | Burton |
| 4,514,383 A | 4/1985 | Murray et al. |
| 4,556,560 A | 12/1985 | Buckingham |
| 4,569,839 A | 2/1986 | Grollier et al. |
| 4,574,082 A | 3/1986 | Tietjen et al. |
| 4,672,074 A | 6/1987 | Harendza-Harinxma |
| 4,725,438 A | 2/1988 | Leazer |
| 4,800,076 A | 1/1989 | Bhat et al. |
| 4,816,254 A | 3/1989 | Moss |
| 4,842,593 A | 6/1989 | Jordan et al. |
| 4,847,071 A | 7/1989 | Bissett et al. |
| RE33,107 E | 11/1989 | Dikstein et al. |
| 4,911,932 A | 3/1990 | Clum et al. |
| 4,933,330 A | 6/1990 | Jorgensen et al. |
| 4,938,960 A | 7/1990 | Ismail |
| 4,996,238 A | 2/1991 | Matravers |

(Continued)

OTHER PUBLICATIONS

U.S. Appl. No. 12/767,320, filed Apr. 26, 2010, Klofta, et al.

(Continued)

*Primary Examiner* — Ryan Ochylski

(74) *Attorney, Agent, or Firm* — Kathleen Y. Carter; John G. Powell

(57) ABSTRACT

A method of making a personal care product that is capable of dispensing a composition onto a surface in the form of a film without the use of an additional applicator. The method includes providing a collapsible bag at least partially surrounded by an elastically deformable member and, optionally, an outer container body. Potential energy is generated by stretching the elastically deformable member, which is used to dispense the composition in lieu of a propellant or pump. The personal care composition may be a skin care composition, an antifungal, or an enzyme inhibiting composition.

18 Claims, 13 Drawing Sheets

(56) References Cited

U.S. PATENT DOCUMENTS

| | | |
|---|---|---|
| 4,996,239 A | 2/1991 | Matravers |
| 5,043,359 A | 8/1991 | Ward et al. |
| 5,085,856 A | 2/1992 | Dunphy et al. |
| 5,137,714 A | 8/1992 | Scott |
| 5,208,031 A | 5/1993 | Kelly |
| 5,210,102 A | 5/1993 | Klimesch |
| 5,232,126 A | 8/1993 | Winer |
| 5,232,691 A | 8/1993 | Lemole |
| 5,234,689 A | 8/1993 | Lindaver et al. |
| 5,266,318 A | 11/1993 | Taylor-McCord |
| 5,362,488 A | 11/1994 | Sibley et al. |
| 5,389,204 A | 2/1995 | Ampulski |
| 5,436,007 A | 7/1995 | Hartung et al. |
| 5,527,519 A | 6/1996 | Miksits et al. |
| 5,543,135 A | 8/1996 | Dahms |
| 5,545,673 A | 8/1996 | Kelly |
| 5,558,872 A | 9/1996 | Jones et al. |
| 5,573,753 A | 11/1996 | Tapley |
| 5,576,006 A | 11/1996 | Smith |
| 5,603,863 A | 2/1997 | Dahms |
| 5,616,331 A | 4/1997 | Allard et al. |
| 5,635,191 A | 6/1997 | Roe et al. |
| 5,643,588 A | 7/1997 | Roe et al. |
| 5,652,274 A | 7/1997 | Martin |
| 5,662,937 A | 9/1997 | McCuaig |
| 5,665,426 A | 9/1997 | Krysik et al. |
| 5,730,993 A | 3/1998 | Allard et al. |
| 5,733,895 A | 3/1998 | Forestier et al. |
| 5,744,146 A | 4/1998 | Eters et al. |
| 5,756,082 A | 5/1998 | Cashin et al. |
| 5,756,110 A | 5/1998 | Allard et al. |
| 5,762,945 A | 6/1998 | Ashley |
| 5,776,440 A | 7/1998 | Forestier et al. |
| 5,834,290 A | 11/1998 | Egelrud et al. |
| 5,861,143 A | 1/1999 | Peterson et al. |
| 5,861,144 A | 1/1999 | Peterson et al. |
| 5,861,146 A | 1/1999 | Peterson et al. |
| 5,863,522 A | 1/1999 | Forestier et al. |
| 5,869,061 A | 2/1999 | Brugh |
| 5,869,062 A | 2/1999 | Oliver |
| 5,869,071 A | 2/1999 | Wieselman et al. |
| 5,874,094 A | 2/1999 | Castello |
| 5,885,599 A | 3/1999 | Peterson et al. |
| 5,914,101 A | 6/1999 | Tapley et al. |
| 5,939,053 A | 8/1999 | Forestier et al. |
| 5,945,211 A | 8/1999 | Yamaguchi et al. |
| 5,958,397 A | 9/1999 | Smerbeck et al. |
| 5,961,961 A | 10/1999 | Dobkowski et al. |
| 5,962,441 A | 10/1999 | Blank |
| 5,965,137 A | 10/1999 | Petrus |
| 5,965,610 A | 10/1999 | Modak et al. |
| 5,968,531 A | 10/1999 | Miyoshi et al. |
| 5,972,359 A | 10/1999 | Sine et al. |
| 2005/0277694 A1* | 12/2005 | Stock et al. .................. 514/558 |
| 2006/0210746 A1 | 9/2006 | Shi et al. |
| 2010/0133294 A1* | 6/2010 | Chan et al. .................. 222/95 |
| 2010/0133295 A1* | 6/2010 | Chan et al. .................. 222/95 |

OTHER PUBLICATIONS

U.S. Appl. No. 12/767,251, filed Apr. 26, 2010, Klofta, et al.

Invitation to Pay Additional Fees, PCT/US2011/033711, mailed Oct. 9, 2012, 9 pages.

* cited by examiner

METHOD FOR MAKING A PERSONAL CARE PRODUCT

FIELD OF THE INVENTION

A method for making a personal care product is provided. Specifically, a method for providing a personal care composition contained in a non-pump, non-aerosol, tube-in-sleeve type dispenser, which when dispensed forms a suitable film on a surface without the use of an additional applicator or without the need for additional spreading onto the surface by the user.

BACKGROUND OF THE INVENTION

Undesirable skin conditions, often associated with dry skin, occur in varying degrees and at various times for most humans. These undesirable skin conditions may be particularly evident in winter. Skin care products formulated to address the causes and symptoms of dry skin are widely known. Undesirable skin conditions may also be caused by fungal infections. For example, fungal infections are known to attack the skin of humans and cause redness, itching, burning, peeling, cracking, scaling, flaking, and in some cases even blisters and sores on the skin. One commonly known fungal organism, *Candida albicans*, is known to play a part in the occurrence of "diaper rash" in infants. Another known cause of skin ailments is related to exposure of the skin to certain fecal enzymes. For example, it is believed that fecal proteolytic and lipolytic enzymes, of intestinal and/or pancreatic origin, may play a direct role in causing diaper rash, which can directly lead to undesirable ailments such as skin irritation and inflammation. Proteases and lipases are classes of enzymes produced by the body to help degrade proteins and fats in the digestive process. When in contact with the skin of a human, these enzymes are capable of irritating the skin.

A variety of containers and delivery systems have been developed for storing, dispensing, and applying skin care compositions to skin or other surfaces (e.g., human skin, animal skin, substrate surfaces). One well known dispensing system is a simple "squeezable" container. That is, a container formed from a flexible material to which a user can apply pressure by squeezing, thereby reducing the internal volume of the container and forcing the contents of the container out through an opening. However, at least some commonly known squeezable containers expel their contents in a manner that may be hard to control. For example, some commonly known lotion dispensers may initially dispense a "blob" of lotion, but eventually stop dispensing, or worse, begin a sort of "splattering" or "sputtering" of lotion, which may result in contamination of clothing or other surfaces. Because of the inexact method of dispensing the skin care composition out of a squeezable container (i.e., applying too much or too little pressure), a user may not dispense the desired amount of lotion. In addition, it may be necessary for a user to spread the skin care composition over the desired area of the body with a hand or finger, resulting in the undesirable contamination of the hands/fingers and/or discomfort to the irritated, highly sensitive areas of the skin.

Aerosol delivery systems have been widely used to deliver a variety of consumer goods, including personal care compositions because they typically "atomize" the composition, which may reduce the need for spreading the composition over the skin (e.g., with a hand or fingers). Aerosol systems typically utilize volatile propellants to push the product out of a container. Aerosol technology has gained favor for being both effective and relatively inexpensive. But the release of traditionally used fluorocarbon and hydrocarbon type propellants into the atmosphere is undesirable due to the actual and perceived negative impacts these chemicals may have on the environment. Another disadvantage is that the aerosol containers are considered pressure vessels, which can necessitate extra safety equipment and procedures during its manufacture. The pressurized containers can also create concern for human injury if problems arise during storage, use, or disposal. And the high internal pressure accompanying many aerosol products may limit the material and geometry options for the container. Yet another disadvantage is that as the amount of product in the container decreases through normal use, the pressure inside the container typically decreases. In at least some instances, when the container no longer has sufficient pressure to expel the stored product, there may still be a useful amount of product remaining in the container. And when the aerosol container is discarded, the remaining product is wasted or may even result in undesirable environmental pollution. Still another disadvantage of aerosol dispensers is that when used to apply a composition to the skin of a user, the composition tends to be expelled at an undesirably cold temperature and may create a feeling of discomfort on the skin of a user.

A pump system is one alternative to aerosols and squeezable containers. Pump systems generally dispense a metered amount of product by actuating a pump. However, different consumers may not all desire the same amount of product for a particular use, and thus difficulty arises in providing a proper metered amount that is satisfactory to all users. For example, a first consumer may need to pump a dispenser two times to dispense the desired amount of product, while another consumer may only require one pump of the same dispenser. And if the desired amount of product is somewhere between pumps, the consumer may become frustrated in attempting to use the pump dispenser. In addition, pump systems typically must be properly oriented to function as intended. For example, some commonly known pump systems will not function properly when the pump is oriented upside-down or even sideways. And some pump systems may dispense undesirably, intermittently, or not at all as the amount of product in the container is depleted. Further, some pump systems may be better than aerosol containers when it comes to expelling the contents the container, but pump systems may still be unable to expel substantially all of their contents.

Delivery systems that utilize a collapsible bag in combination with an elastic component are known. However, such delivery systems are typically arranged such that a majority, if not all, of the band expansion and contraction occurs in the radial direction. For example, the bottom of the collapsible bag and/or elastic component may be permanently affixed to one another and/or the bottom of the container such that the affixed components are unable to expand or contract in the axial direction. Such an arrangement can lead to an undesirable amount of the contents of the bag being trapped in the bottom and unavailable for use. Additionally, at least some prior art collapsible bags are generally made using an injection stretch blow molding process wherein a preform is injection molded and then stretched and blown in a blow mold. In the prior art method, the elastomeric band is not placed around the preform before and/or during the blow molding process. Instead, the preform is first blown into a bag and allowed to cure. Then, the bag is removed from the mold, collapsed radially, and then inserted into the band via a separate process.

Accordingly, it would be desirable to provide a simplified method for making a personal care product which utilizes a non-pump, non-aerosol dispenser capable of dispensing substantially all of the composition stored therein. It would also be desirable to provide a method for making a personal product that dispenses a personal care composition in the form of a film without the use of an additional applicator or without the additional requirement of spreading by the user. It would further be desirable to provide a method of making a personal care product that utilizes a dispenser that does not clog.

SUMMARY OF THE INVENTION

In order to provide a solution to the problems described above, a method for treating a skin ailment without the use of an additional applicator is disclosed herein. The method comprises providing a personal care product, actuating a valve member such that the personal care composition is dispensed through the opening at a pressure, and applying the personal care composition directly to a portion of compromised skin to form a film thereon. The personal care product comprises an outer container and an at least partially expanded collapsible bag disposed in the outer container. The collapsible bag includes an elastic member surrounding at least a portion of the collapsible bag such that the elastic member is stretched axially and radially. The elastic member is constructed of an elastically extensible material that permits the transfer of infrared radiation through at least a portion of the elastic member. The personal care product further includes a personal care composition disposed in the collapsible bag. The personal care composition is suitable for treating a skin ailment. The personal care product also includes a normally-closed actuatable valve member, which, when actuated, provides a flow path for the personal care composition to flow from the collapsible bag through an opening to an external environment.

DETAILED DESCRIPTION OF THE INVENTION

Figure 1A:
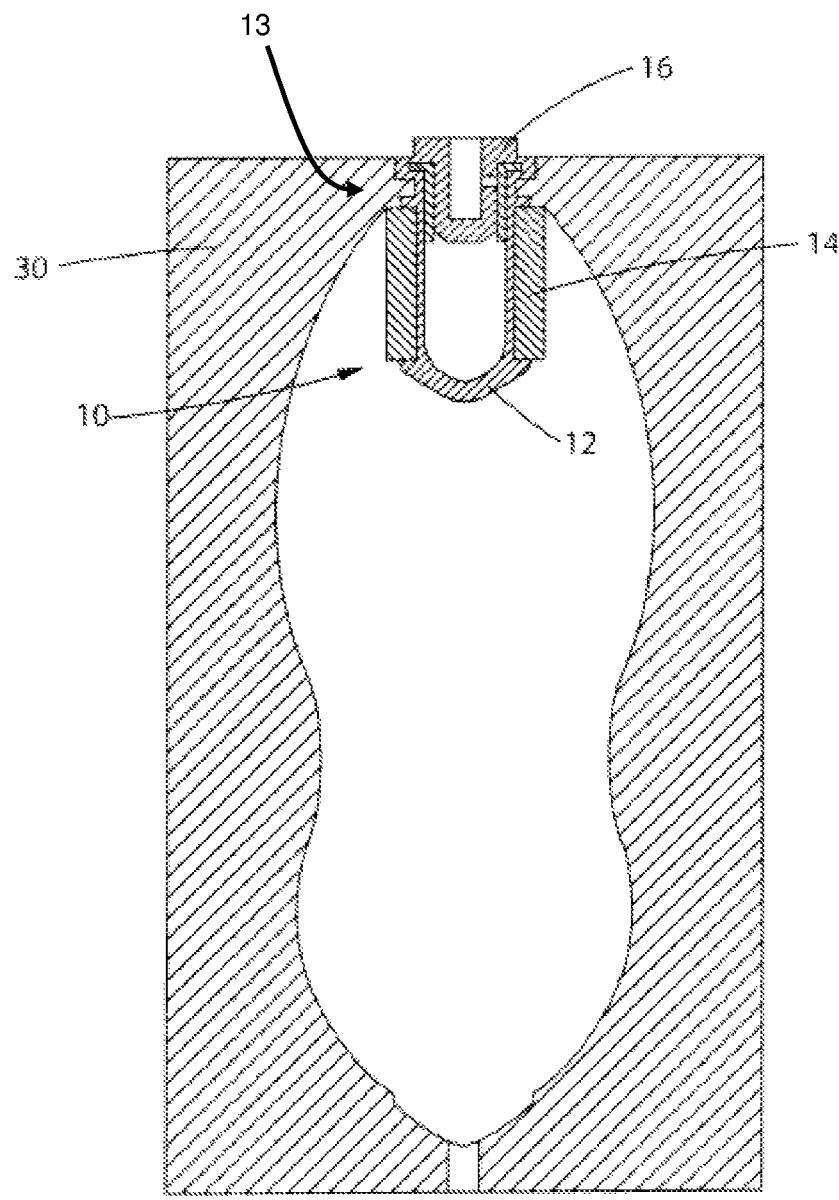
FIGS. 1A-1C are cross-section views of an embodiment of a personal care product.

The present personal care product utilizes an elastically extensible, tube-in-sleeve type of dispenser to provide a convenient and environmentally friendly way to apply a personal care composition to skin. The tube-in-sleeve type dispenser disclosed herein is capable of dispensing substantially all of the skin composition stored therein (e.g., more than 90%; 92%; 93%; 94%; 95%; or, ideally, 100%) and does not require undesirable chemical propellants. Additionally, the present tube-in-sleeve type dispenser is capable of desirably dispensing the stored personal care composition in a variety of container positions (e.g., upside-down, right-side-up, or sideways). Since the present personal care product does not need to be highly pressurized like an aerosol dispenser, the personal care composition may be dispensed at a temperature which is not substantially different than the ambient temperature of the surrounding environment. Surprisingly, it has also been found that the present personal care product provides the unexpected benefit of being substantially cheaper to manufacture than commonly known aerosol and pump dispensers.

Certain properties described herein may include one or more ranges of values. It is to be understood that these ranges include every value within the range, even though the individual values in the range may not be expressly disclosed.

"Axial" means the direction generally corresponding to the lengthwise direction of an article.

"Collapsible" and variations thereof mean that the volume of an article or component (e.g., a collapsible bag or other flexible container) can be reduced by at least 50% but less than 100% (e.g., 60%, 70%, 80%, 90%, 95%, 98%, or even 99%), relative to its volume in an expanded state, by an externally applied pressure of between 100 kPa and 600 kPa (e.g., 200-400 kPa, 260-340 kPa; or even 300 kPa) without substantial degradation of the performance of the article or component or damage to surrounding components that would impair the article's continued use.

"Compromised skin" means skin that is afflicted with a skin ailment such as one or more of the skin ailments disclosed herein.

"Elastic" and "elastically extensible" mean the ability of a material to stretch by at least 50% without rupture or breakage at a given load, and upon release of the load the elastic material or component exhibits at least 80% recovery (i.e., has less than 20% set). For example, an elastic material that has an initial length of 100 mm can stretch to at least 150 mm (50% stretch) and, upon removal of the force, retract to a length of 110 mm (i.e., have a set of 10 mm or 10%). Stretch, sometimes referred to as strain, percent strain, or elongation, along with recovery and set may each be determined according to a suitable hysteresis test commonly known in the art. It is to be understood; however, that this definition of elastic does not apply to materials that do not have the proper dimensions (e.g., not wide enough) to be properly subjected to a suitable hysteresis test. Instead, such material is considered to be elastic if it can stretch to at least 50% upon application of a biasing force, and return substantially to its original length (i.e., exhibit less than 20% set) upon release of the biasing force.

"Expandable" and variations thereof mean that the volume of an article or component (e.g., a polymeric preform or collapsible bag) can be increased by at least 50% up to 1000 times (e.g., 100%; 400%; 800%; 1200%; 2000%; 6000% or more) its volume in a relaxed or collapsed state, without rupture or breakage of the element. For example, a preform may have an initial volume of 10 ml, but when expanded (e.g., by filling with a gas and/or a personal care composition) the volume is increased to 1 liter.

"Extensible" means the ability to stretch or elongate, without rupture or breakage, by at least 50%.

"Film" means a layer or coating that appears to be substantially continuous (i.e., substantially non-porous) when perceived by the human eye at a distance of 45 cm.

"Infrared" or "infrared light" ("IR") means electromagnetic radiation having a wavelength of between 700 nanometers ("nm") and 1 millimeter ("mm").

"Joined" means configurations whereby an element is directly secured to another element by affixing the element directly to the other element, and configurations whereby an element is indirectly secured to another element by affixing the element to intermediate member(s) that in turn are affixed to the other element.

"Plastic" and "plastically extensible" mean the ability of a material to stretch by at least 50% without rupture or breakage at a given load and, upon release of the load the material or component, exhibits at least 20% set (i.e., recovers less than 80%). For example, an extensible material that has an initial length of 100 mm can stretch at least to 150 mm (50% stretch) and, upon removal of the applied force, retract to a length of 35 mm (i.e., have a set of 35 mm (35% set), when subjected to a suitable hysteresis test commonly known in the art.

"Operatively exhausted" means that a composition contained in a container is depleted such that the container is no longer able to dispense the composition as intended. By way of example, a container is initially filled to capacity with a personal care composition (i.e., is 100% full) and then the composition is dispensed until less than 5% of the initial amount, but greater than 0%, remains, at which time the container ceases to dispense any more of the composition. In this example, even though there is still some amount of residual composition remaining in the container, the container is operatively exhausted. It is to be appreciated that a container may be operatively exhausted and still dispense composition, if the composition is not dispensed as intended (e.g., exit pressure is too low, sputtering, dripping and the like). Ideally, the personal care product disclosed herein will dispense substantially all of the composition stored in it before being operatively exhausted.

"Preform" means a material, element, component, or article that has undergone preliminary shaping but is not yet in its final form.

"Radial" means the direction perpendicular to the axial direction, and generally corresponds to the widthwise direction of an article.

"Relaxed" means the state of an element, material or component at rest with substantially no external force acting on the element, other than gravity.

Personal Care Composition

Personal care compositions for use herein are not particularly limited and include, for example, skin care compositions, antifungal compositions, and enzyme inhibiting compositions. Suitable personal care compositions may be in the form of, for example, lotions, creams, pastes, balms, ointments, pomades, gels, liquids, combinations of these and the like, and may also contain solids to further enhance the benefits for the consumer. The personal care compositions disclosed herein include at least one active ingredient. An active ingredient is generally recognized as an ingredient that causes the intended pharmacological effect. For the personal care compositions disclosed herein, the pharmacological effect produced by the active ingredient aids in the treatment and/or prevention of skin ailments related to diaper rash, eczema, cradle cap, fungal infection, hives, head rash, and/or undesirable enzyme activity. For example, an active ingredient may soothe the symptoms associated with diaper rash, help reduce moisture loss from the skin, moisturize the skin, eliminate fungal infection, and/or neutralize enzyme activity. Active ingredient(s) may be present in an amount of between 0.001 and 100% by weight based on the weight of the personal care composition ("wt %"). It is to be appreciated that the amount of active ingredient(s) may include any percentage in this range. Examples of skin care compositions are disclosed in the copending U.S. application titled "PERSONAL CARE PRODUCT," identified as P&G Docket No. 11693, and filed on Apr. 26, 2010 by Klofta, et al.

Some skin care compositions are applied to human skin for addressing skin damage related to a lack of moisture (i.e., "dry skin"). Skin care compositions may also address the visual look of the skin (e.g., reduce the appearance of flaky, cracked, and/or red skin) and/or the tactile feel of the skin (e.g., reduce roughness and/or dryness of the skin while improved the softness and subtleness of the skin). Skin care compositions typically include at least one active ingredient for the treatment or prevention of skin ailments like diaper rash or for providing a moisturizing benefit to skin, such as zinc oxide, petrolatum, white petrolatum, mineral oil, cod liver oil, lanolin, dimethicone, hard fat, vitamin A, allantoin, calamine, kaolin, glycerin, and colloidal oatmeal, and combinations of these. Additionally or alternatively, the skin care composition may include one or more natural moisturizing factors ("NMFs"). NMFs are the collection of certain water-soluble compounds found in the stratum corneum of human skin. NMFs typically comprise between 20 and 30% of the dry weight of the corneocyte. NMFs typically absorb water from the atmosphere and combine it with their own water content to allow the outermost layers of the stratum corneum to stay hydrated despite exposure to the elements. But because at least some NMF components are water soluble, they may be easily leached from the cells with water contact, which is one reason why repeated contact with water may actually make the skin drier. While human skin typically includes a lipid layer that surrounds the corneocyte and helps to prevent loss of NMFs, it may be desirable to provide NMFs in a skin care composition to replace at least some of the lost NMFs. NMFs may optionally be included in the present skin care composition in an amount of between 0 and 10 wt %. Suitable examples of NMFs and ingredients employed to help prevent the loss of NMFs from the skin include ceramides, hyaluronic acid, glycerin, squalane, amino acids, cholesterol, fatty acids, triglycerides, phospholipids, glycosphingolipids, urea, linoleic acid, glycosaminoglycans, mucopolysaccharide, sodium lactate, and sodium PCA (sodium pyrrolidone carboxylate). Other ingredients, which mimic the lipid content of human skin, and thus may be helpful in making dry skin look and feel better, may be included in the present skin care composition and include, without limitation, glycerides, apricot kernel oil, canola oil, squalane, squalene, coconut oil, corn oil, jojoba oil, jojoba wax, lecithin, olive oil, safflower oil, sesame oil, shea butter, soybean oil, sweet almond oil, sunflower oil, tea tree oil, shea butter, palm oil, cholesterol, cholesterol esters, wax esters, fatty acids, and orange oil.

Antifungal compositions are generally understood to be substances that inhibit or prevent the growth of fungus and/or kill or destroy fungal cells. Antifungal compositions suitable for use herein are not particularly limited, but generally include at least one antifungal agent for providing an antifungal benefit to the skin of a human. The antifungal agent may be present in an amount of between 0.01 and 100 wt %. It is to be appreciated that the amount of antifungal agent(s) may include any percentage in this range. Examples of antifungal agents include, without limitation, polyene antifungal agents (e.g., natamycin, rimocidin, nystatin, amphotericin B, candicin, hamycin); azole antifungal agents (e.g., imidazoles, triazoles, and thiazoles); allylamines; echinocandins; and effective combinations of these. In addition to the foregoing, other compositions may provide suitable antifungal properties to be useful as an antifungal agent in the compositions disclosed herein. For example, benzoic acid in combination with a keratolytic agent; ciclopirox olamine; tolnaftate; undecylenic acid; flucytosine; griseofulvin; haloprogin and effective combinations of these.

Enzyme inhibiting compositions are substances that inhibit or prevent the biological activity of fecal enzymes, which leads to skin irritation and/or diaper rash. It is believed, without being limited by theory, that fecal proteolytic and lipolytic enzymes, of intestinal and/or pancreatic origin, play a direct role in causing diaper rash and its associated, undesirable skin ailments. Enzyme inhibiting compositions suitable for use herein are not particularly limited, but generally include at least one enzyme inhibiting agent for neutralizing the enzymatic activity of at least one enzyme typically found in human feces. The enzyme inhibiting agent may be present in an amount of between 0.01 and 100 wt %. It is to be appreciated that the amount of enzyme inhibiting agent(s) may include any percentage in this range. Examples of enzyme inhibiting agents include, without limitation, hexamidine; triacetin; phytic acid; water soluble lipase inhibitors in the form of metallic salts such as zinc chloride; chelating agents such as ethylenediamine tetraacetic acid for restricting the availability of protease cofactors; esters of fatty alcohols; saturated, unsaturated, linear or branched zinc salts of a fatty acid of from 12 to 24 carbon atoms; aminated acylated acids such as propionylcysteine, propionylhydroxyproline or caproylcysteine; and effective combinations of these.

It may be desirable to optionally include active ingredients suitable for treating wounds such as burn or cuts. For example, antibacterial agents such as benzalkonium chloride, benzethonium chloride, methylbenzethonium chloride, phenol, povidone-iodine complex, chlorhexidene and derivatives (e.g., chlorhexidene gluconate), cetrimonium bromide, cetrimonium chloride, cetrimonium stearate, cetylpyridinium chloride, octenidine dihydrochloride, thymol, triclosan, and terpenes (e.g., tea tree oil) may be included in the personal care composition. Still other optional active ingredients include wound healing agents such as panthenol, pantothenic acid, calcium panththenate, grape seed extract, manuka honey, and ulmo honey. Further option ingredients include local anesthetics, sometimes referred to as numbing agents. Examples of numbing agents include lidocaine, benzocaine, novocaine, chloroprocaine, etidocaine, prilocalne, and ropivacaine.

The personal care compositions disclosed herein may include one or more pH buffers to maintain the composition at a desired pH. Typically, human skin has a pH of between 4 and 6 to provide an acidic environment that is deleterious to bacteria and other undesirable microbes that may be present on the surface of the skin. It is believed, without being limited by theory that effectively maintaining skin pH in its natural acidic state may also counteract the irritating effects of ammonia and potentially reduce the activity of fecal enzymes. In order for the skin to have good elasticity and act as a suitable barrier against infection, it is important to maintain the pH of the skin at its natural pH or pH range. Thus, it may be desirable to include a pH buffer in the personal care composition to provide a suitable pH or pH range, for example, between 4 and 7, or even 5.5. The pH buffer may be present in an amount of between 0.1 and 10 wt %. Suitable examples of pH buffers for use herein include, without limitation, citric acid, boric acid, lactic acid, glycolic acid, gluconic acid, malic acid, maleic acid, other fruit acids, potassium hydrogen phthalate, each of these in combination with their respective conjugate base, and mixtures thereof.

In certain embodiments, it may be important to include a humectant in the personal care composition. Humectants are substances known to readily absorb water, even from the air (i.e., they are hygroscopic). Examples of humectants include glycerine, polyglycerols, propylene glycol, ethylene glycol, glyceryl triacetate, polyethylene glycols, polypropylene glycols, and polyols such as sorbitol, glucose, fructose, and 1,5-pentylene diol. When the present personal care composition is dispensed from a container, residual amounts of skin care composition may remain around the dispensing opening of the container, depending on the type of container/dispenser. As the liquid components (if any) of this residual composition dry up, only the particulates are left (e.g., particles of zinc oxide). These particulates may clog or block a portion or all of the dispensing opening, which may undesirably interfere with future dispensing of the composition. By including a humectant in the skin care composition, any residual skin care composition present around the dispensing opening of the dispenser may stay sufficiently moist for up to 3, 7, 10, 14, or even 21 days or more, and thereby reduce the likelihood of a clog or undesirable blockage of the dispensing opening.

The personal care composition may include one or more anti-stick ingredients to reduce the tendency of certain contaminants to stick to the skin (e.g., dirt; bacteria; bodily exudates such as urine, feces, mucous, and blood; plaque; grease; food residue; and the like). The anti-stick ingredients may be present in an amount of between 0.1 and 100 wt %. Examples of anti-stick ingredients suitable for use herein include, without limitation, polyethylene glycols ("PEG") such at PEG-400, PEG-4000, triols such as glycerin, ethoxylated fatty alcohols such as steareth-50 and ceteth-150, ethoxylated fatty acids such as polyoxyethylene (100) stearate, propylene glycol, polypropylene glycol, sugars such as glucose and sorbitol, sugar based surfactants such as sorbitan esters and ethoxylated sorbitan esters, sucrose esters and ethoxylated sucrose esters and alkyl polyglycosides, diols such as hexylene diol, and PEG8 phosphate ester.

The personal care composition may include one or more other optional ingredients such as aroma therapy ingredients (e.g., chamomile), anti-oxidants (e.g., tocopherol), consumer recognized skin beneficial ingredients (e.g., aloe), preservatives (e.g., phenoxy ethanol), and stabilizers (e.g., xanthan gum). Other examples of optional ingredients include, without limitation, lavender, oatmeal extract, vitamin E acetate, green tea extract, milk proteins, and calundula.

The personal care composition may include a carrier material. The carrier material provides a matrix in which the other ingredients of the personal care composition are dispersed and which helps to provide a relatively uniform distribution of the other personal care composition ingredients on the skin of a user. The carrier material may be present in an amount of between 1 and 99 wt %. Suitable examples of hydrophilic carrier materials include water, low molecular alcohols like ethyl alcohol, polyethylene glycols, propylene glycols, glycerin, and other low molecular weight diols, triols, and polyols that are liquids at room temperature. In certain instances, the carrier may also be an organic or silicone based carrier like mineral oil, isoparaffinic fluids like isododecane or isohexadecane or isoeicosanes or mixtures thereof, cyclopentasiloxane, low molecular weight silicone fluids like 10 centistoke dimethicone fluid, or esters like isopropyl myritate.

In order to provide a personal care composition that forms a suitable film layer on skin or other substrates and does not require additional manipulation after being applied (e.g., spreading with the hands or fingers), it is important that the skin care composition have a proper balance of viscosity, surface tension, and droplet size. These properties may be influenced by the ingredients of the composition as well as the structural properties of the container. For example, the personal care composition may require a high enough viscosity to keep the individual ingredients of the composition from separating out, but sufficiently low enough to permit the composition to be easily dispensed. Further, the nozzle shape and/or size may impact the viscosity of the composition as it exits the container (e.g., non-Newtonian fluids may experience the commonly known phenomenon of shear thickening or shear thinning). Thus, suitable viscosities range from 50 to 5000 centipoise ("cP"), from 200 to 2500 cP, or even from 500 to 1500 cp when measured at 22° C. with a DV-III+Rheometer (available from Brookfield Inc.) using a RV#3 spindle rotating at 30 RPM. Similarly, it is important that the surface tension of the personal care composition be high enough to form droplets when dispensed from a container as intended and to keep the composition from "running" once it is applied to the skin, but low enough to provide sufficiently small droplets. If the droplets are too big, the applied composition may not appear as a suitable film on the skin but rather as a multitude of individual droplets. In addition, large droplet sizes may be an indication of an unstable composition (e.g., prone to separation). A user or caregiver who perceives a multitude of droplets as opposed to a film may attempt to further spread out the droplets, resulting in undesirable contamination of a hand, finger(s), and/or other surface or substrate used to spread the composition. Suitable droplets for the dispensed compositions disclosed herein may be from 100 nm to 100 µm in diameter. For effective wetting, spreading, and/or adhesion to a surface such as skin, the surface tension of the composition to be applied should be lower than that of the surface to which it is applied. Depending on the actual conditions of humidity and temperature, the surface tension of human skin is typically between 38 mN/m and 56 mN/m. Thus, the surface tension of a composition suitable for applying to skin (i.e., exhibits desirable wetting, spreading and/or adhesion to skin) would be below a surface tension in this range. But the surface tension of the composition should not be so low as to promote excessive spreading of the composition on the surface to which it is applied (e.g., on the skin and/or surface of a diaper). For example, a suitable surface tension for a personal care composition applied to skin may be less than 56 mN/m to promote wetting and adhesion to the skin, but greater than 30 mN/m to avoid excessive spreading of the composition on the skin (e.g., between 35 and 40 mN/m).

Method of Making the Container

Figure 1B:
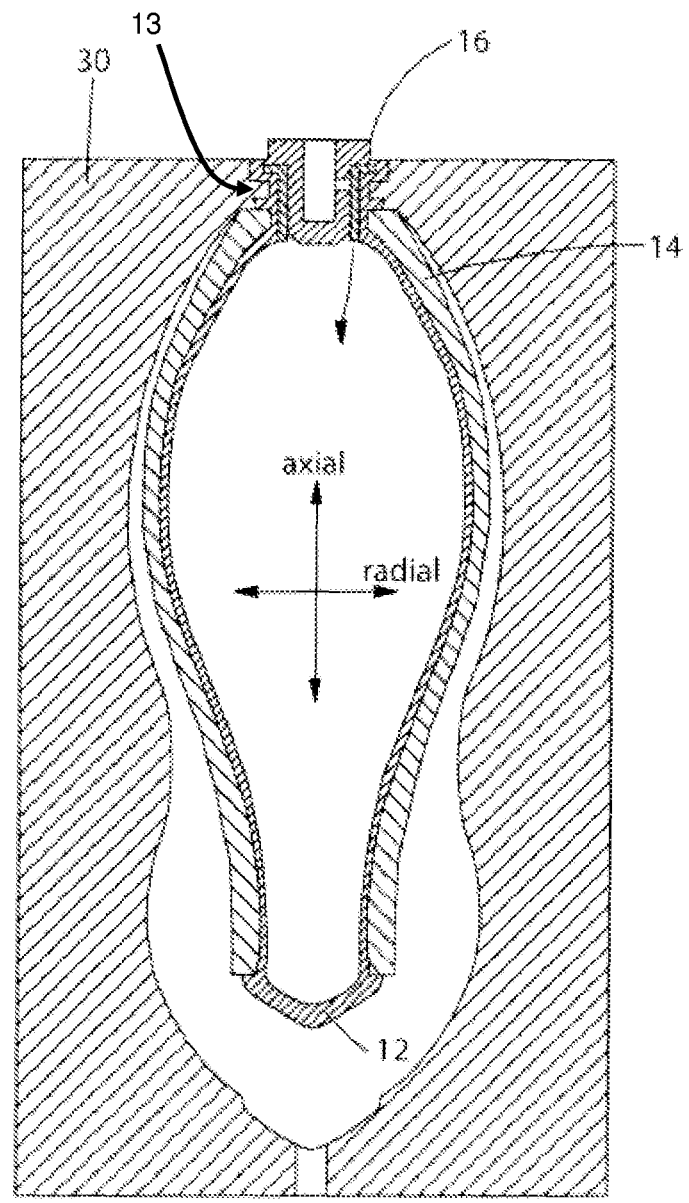
Figure 1C:
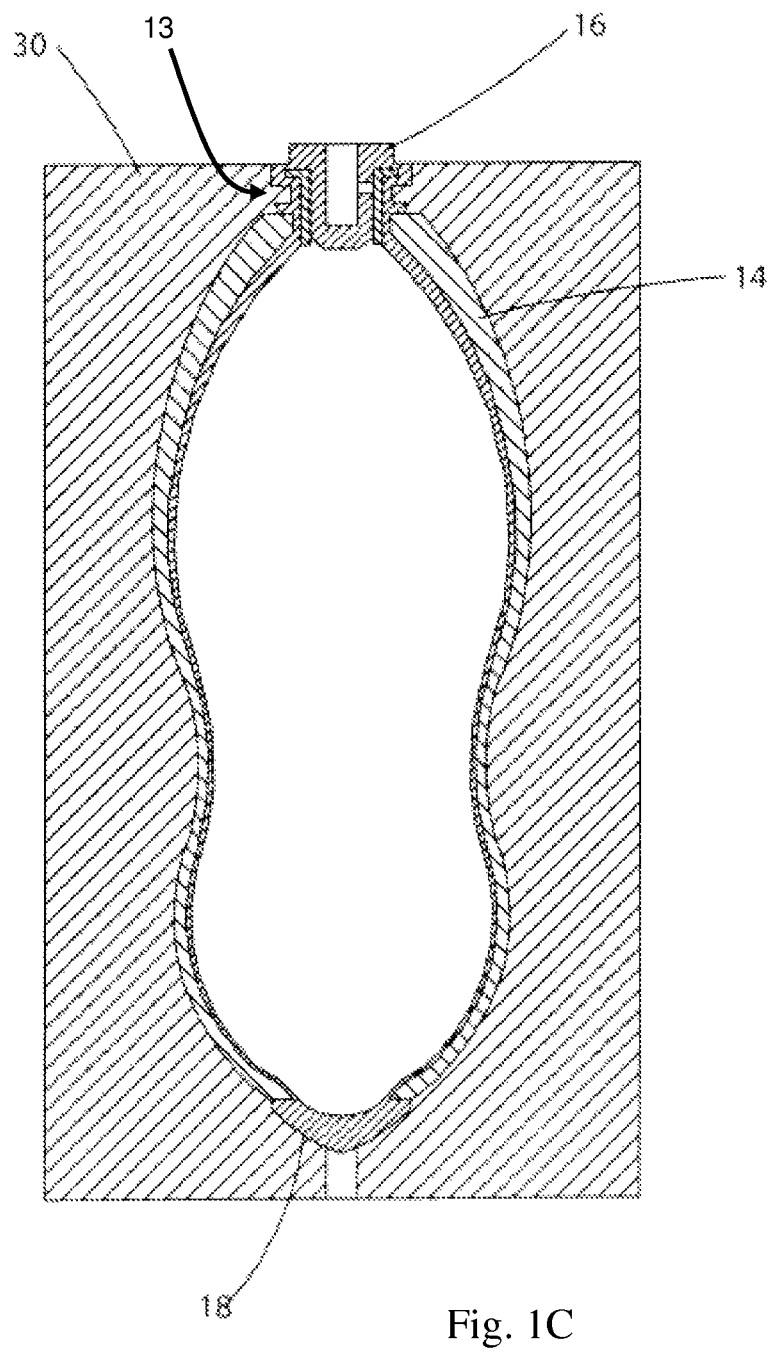

FIGS. 1A-1C illustrate an exemplary method for making a personal care product. A container preform 10 is shown as being inserted into a top portion of a mold 30 for use in a blow molding process. The container preform 10 may include an injection molded polymeric preform 12 and an elastically deformable band 14, which at least partially surrounds a portion or even all of the polymeric preform 12. The elastic band 14 may be joined to the polymeric preform 12 by any means commonly known in the art, as long as it does not undesirably interfere with the ability of the polymeric preform and/or the elastic band 14 to expand and/or collapse. The polymeric preform 12 may be elastically or plastically extensible and is configured to receive a flowable composition such as, for example, one or more of the personal care compositions disclosed herein. The polymeric preform 12 is expanded to form a collapsible bag 18 (e.g., by filling or partially filling the polymeric preform 12 with a gas (e.g., air or nitrogen) or a driven rod or other physical member. The applied pressure may be from 150 kPa to 1000 kPa, or even 584 kPa. Without intending to be limited by theory, it is believed that an applied pressure of within ±200 kPa; ±180 kPa; or even ±160 kPa of 584 kPa may be particularly suitable for expending the polymeric preform 12 quickly and uniformly, without undesirably damaging the polymeric preform 12 or elastic band 14. The polymeric preform 12 and/or the band 14 are expanded or stretched such that potential energy is stored in the stretched elastic band 14 and/or collapsible bag 18. The potential energy generated as a result of stretching the elastic band may be sufficient to generate 1000 kPa or less of hydrostatic pressure, for example, less than 340 kPa; 310 kPa, or even less than 240 kPa, but more than 100 kPa, on the collapsible bag 18 or the contents therein. The pressure generated by the elastic band may depend upon, among other things, the thickness of the elastic band, the modulus of the material from which the elastic band is formed or a combination thereof. That is, the thicker the elastic band, the more potential energy it is capable of generating when stretched. A substantially uniform elastic band 14 suitable for use herein, when relaxed, may have an average wall thickness of between 1 mm and 10 mm The same elastic band 14, when stretched to accommodate an expanded collapsible bag as intended (e.g., as shown in FIG. 1C), may have an average wall thickness of from 100 µm to 400 µm; or from 180 µm to 240 µm, or even from 200 µm to 220 µm.

When making the container preform 10, it may be desirable to heat the polymeric preform 12 prior to stretching it and/or charging it with a flowable composition. It is believed, without being limited by theory, that heating the polymeric preform 12 and/or elastic band 14 softens and/or increase the pliability of the preform 12 and/or band 14. In certain embodiments, all or at least a portion of the polymeric preform 12 may be heated to a temperature ranging from 0.5 to 15° C., or from 5 to 10° C. above the glass transition temperature ("$T_g$") of the polymeric preform 12. The elastic band 14 may also be heated to the same temperature. Heating may be done by transmitting IR or other electromagnetic radiation through the elastic band 14 to the polymeric preform 12.

The polymeric preform 12 may be made of a flexible, extensible, and, optionally, elastic material. Examples of materials suitable for forming the polymeric preform 12 include, without limitation, nylon; polypropylene; polyethylene; low density polyethylene; polybutylene; polyester (e.g., polyethylene terephthalate); high density polyethylene (HDPE); polyamide-based materials; acrylonitrile materials; and combinations of these. Particularly suitable examples are SARANEX brand plastic resin available from DOW Chemical Company, Midland Mich. and BAREX 218 brand thermoplastic acrylic resin available from BP Chemicals Corporation, Ohio. The polymeric preform 12 may be formed of two or more materials, for example, during a co-extrusion blow molding process. In certain embodiments, the material used to form the polymeric preform 12 is relatively inert, such that there are substantially no undesirable tastes or smells imparted to the contents of the collapsible bag. Further, an inert polymeric preform 12 may inhibit or even prevent certain ingredients from undesirably migrating into the collapsible bag from the skin care composition and vice versa. For example, certain skin care compositions use preservatives to increase the effective life of the skin composition. If these preservatives were to migrate out of the skin care composition and into the material of the collapsible bag, the skin care composition might be undesirably affected (e.g., become rancid), such that it does not deliver its expected benefit to a user or exhibits undesirable characteristics (e.g., foul odor or change in appearance). The polymeric preform 12 may be flexible over substantially its entire surface in both the radial and axial dimensions, except that it may be desirable to provide some amount of stiffness in the neck region 13. In certain embodiments, it may even be desirable to provide a polymeric preform 12 that is stiff enough over its entire length to be self-supporting. The walls of the polymeric preform 12 may be of any suitable thickness, as desired. For example, the polymeric preform 12 may have an average wall thickness of from 1.5 mm to 9.5 mm; or even 3.2 mm before it is stretched and an average sidewall thickness of from 25.4 micrometers ("µm") to 50.8 µm when fully expanded (e.g., 30.5 µm to 46 µm) over substantially its entire length except, optionally, at the neck region 13. The portion of the polymeric preform 12 that forms the neck region 13, which can be within 2.5 cm of the valve member 16 when the polymeric preform 12 is expanded, may be thicker. It is to be appreciated that minor variations in thickness at any given cross-section of the polymeric preform are contemplated herein, and are within the scope and spirit of the present disclosure.

Figure 12:
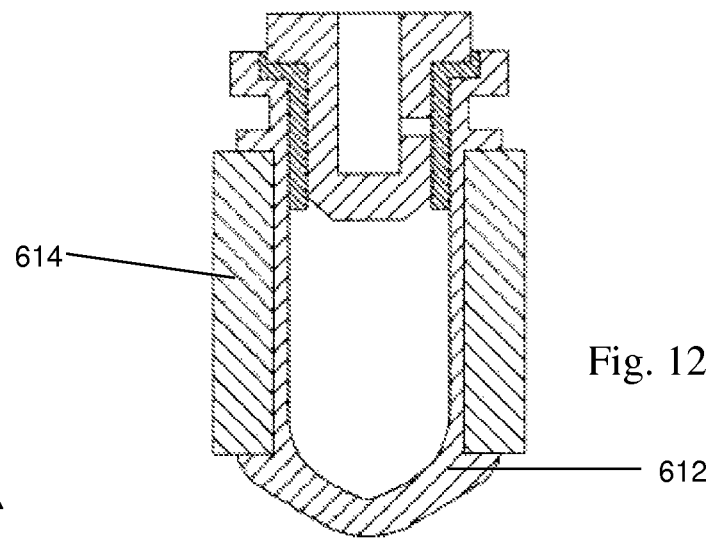
FIGS. 12 and 13 illustrate exemplary dimensional changes that may occur after transitioning a container preform into a collapsible bag.
Figure 13:
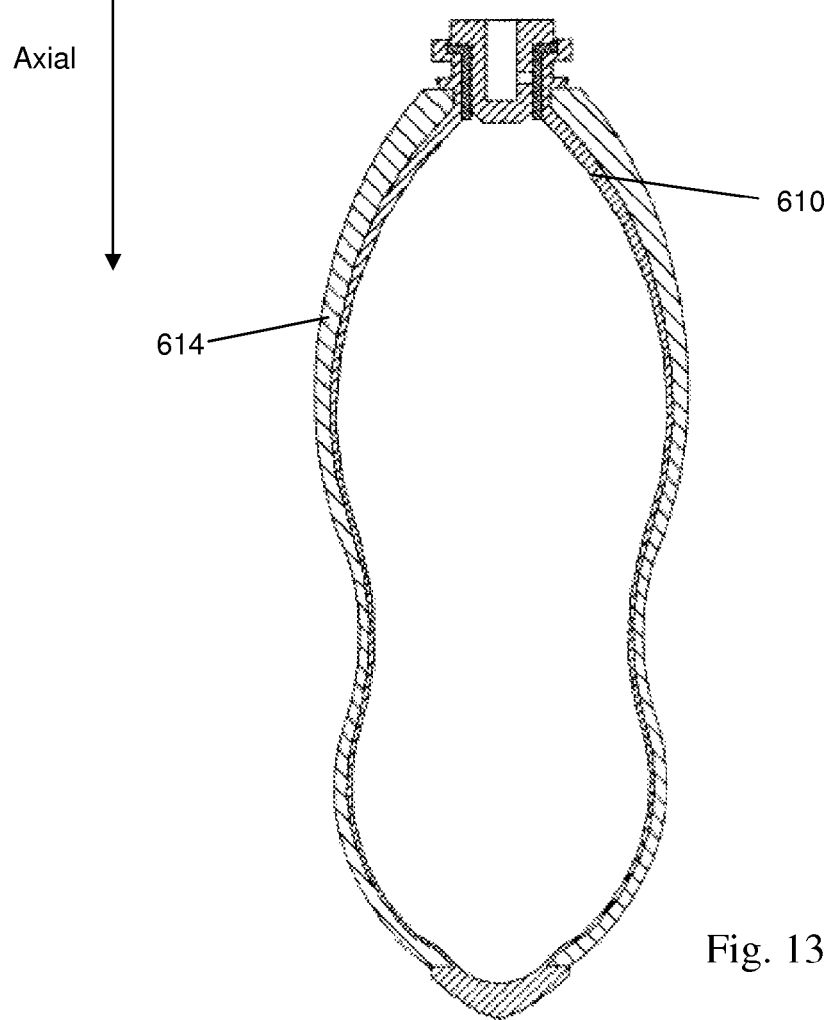

The elastic band is capable of stretching axially and/or radially at least 50% up to more than 750% of its initial unstretched length and/or width. FIGS. 12 and 13 illustrate, by way of example, the difference in size of the elastic band 614 and the polymeric preform 612/collapsible bag 610 in an unstrained state (i.e., FIG. 12) as compared to a stretched state (i.e., FIG. 13). Similarly, during use, the elastic band 614 may shrink or contract in an axial and/or radial direction from 50 to 95% from an initial dispensing at first use to a final dispensing when the product is operatively exhausted. Because of the significant axial expansion and contraction of the elastic band 614, the length of the polymeric preform 612 can be significantly greater than the length of the elastic band 614 in its unstrained/unstretched state. For example, the polymeric preform 612 can be at least about 100%, 150%, 200%, or 300% of the length of the associated and unstrained elastic band 614. Exemplary methods for providing suitable axial expansion of the elastic band 614 are disclosed in co-pending U.S. Ser. No. 12/604,965 filed by Chan, et al., on Oct. 23, 2009.

The elastically deformable band 14 may be formed from an elastically extensible material (e.g., natural rubber, synthetic rubber, and/or a thermoplastic elastomer). Suitable natural rubbers include those which have a tensile strength of at least 24.1 megapascals ("MPa"). Additionally the natural rubber may have a hardness (Shore A) of between 30 and 40, and a 100% Modulus of up to 862 kilopascals ("kPa"). Suitable methods for determining the properties of a rubber material such as those disclosed herein are disclosed in ASTM No. D 412-06$^{e2}$, titled "Standard Test Methods for Vulcanized Rubber and Thermoplastic Elastomers." The elastically deformable band 14 may be formed, for example, from a natural rubber made from a rubber plant (e.g., Guayule shrub or Hevea tree) or a natural rubber modified with latex additives. The elastic band 14 may be formed as a unitary sleeve (e.g., as shown in FIGS. 1A-1C) or formed as one or more discrete bands of elastic material joined to the polymeric preform 12. The elastic band 14 may be configured to provide a uniform or non-uniform pressure to different portions of the collapsible bag. For example, several discrete elastic bands of varying thickness may be positioned at different locations on the collapsible bag. The thicker band(s) may provide more pressure to the portion of the collapsible bag to which it(they) are joined relative to the thinner band(s). The pressure generated by the elastic bands may depend upon, among other things, their thickness, the modulus of the material from which they are formed or a combination thereof. Elastic bands suitable for use herein may have a relaxed thickness of between 1 and 10 mm.

The elastically deformable band 14 may be free or substantially free of carbon black or any other ingredients which would unduly obstruct or interfere with the transmittance of a particular wavelength or wavelengths of electromagnetic radiation. For example, it may be desirable to configure the elastic band 14 such that IR radiation is able to pass through all or at least a portion of the elastic band 14. IR transparency provides the unique benefit of allowing the simultaneous heating of the elastic member 14 and the polymeric preform 12, which may reduce manufacturing complexity and/or cost relative to known containers and methods of making such containers. In certain embodiments, the elastic band 14 may be configured to pass different wavelengths, intensities, and/or combinations of electromagnetic radiation (e.g., UV, visible light, microwave, radio frequency, and/or x-ray radiation).

FIG. 1B shows an exemplary embodiment of a partially expanded container preform 10. The polymeric preform 12 and elastic band 14 are shown expanding both axially and radially. In certain embodiments, the polymeric preform 12 is expanded plastically and the elastic band 14 is expanded or stretched elastically. FIG. 1C shows an example of a fully expanded polymeric preform 12. The polymeric preform 12 and elastic band 14 are expanded such that they extend all the way to the walls of the mold 30 to define a container.

Figure 11:
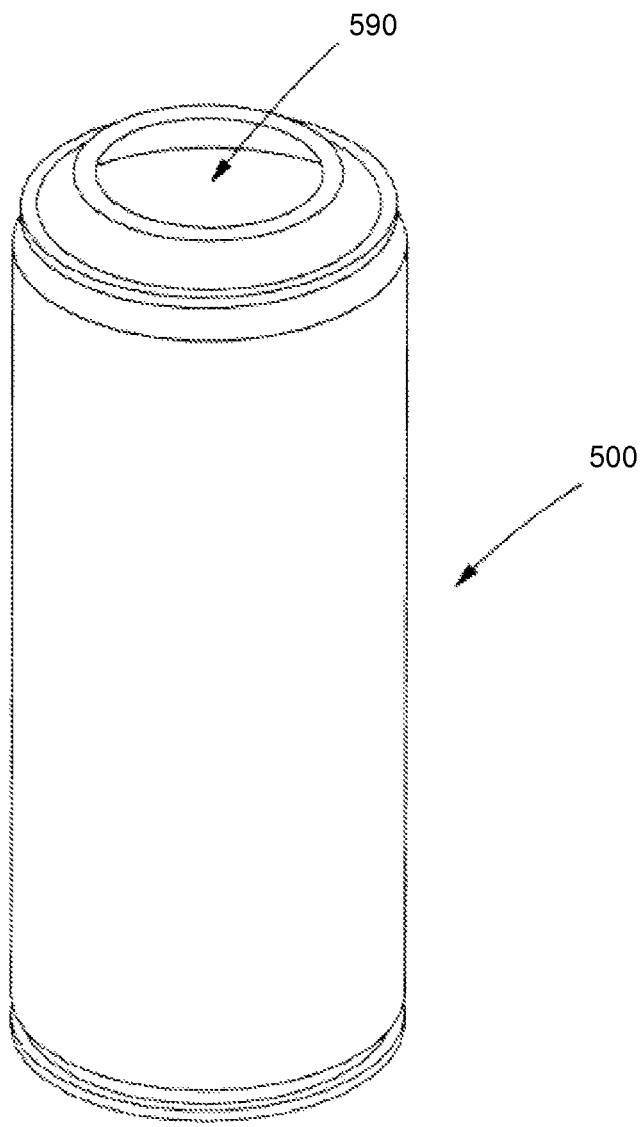
FIG. 11 is a perspective view of an outer container.

Once the polymeric preform 12 has been expanded to the desired volume, the applied internal pressure is removed, and the potential energy associated with the elastic band 14 is permitted to act on the collapsible bag 18 to collapse it in both the axial direction and radial directions. The collapsed bag and surrounding band are now sized and configured for inserting into the top opening 90 of an exemplary can 100 as shown in FIG. 11, or bottle or other outer packaging container. The top of the collapsible bag 18 can employ features that facilitate attachment to the outer packaging container. Additionally or alternatively, the collapsed bag and associated elastic member may be joined with a suitable valve member 16.

Figure 2:
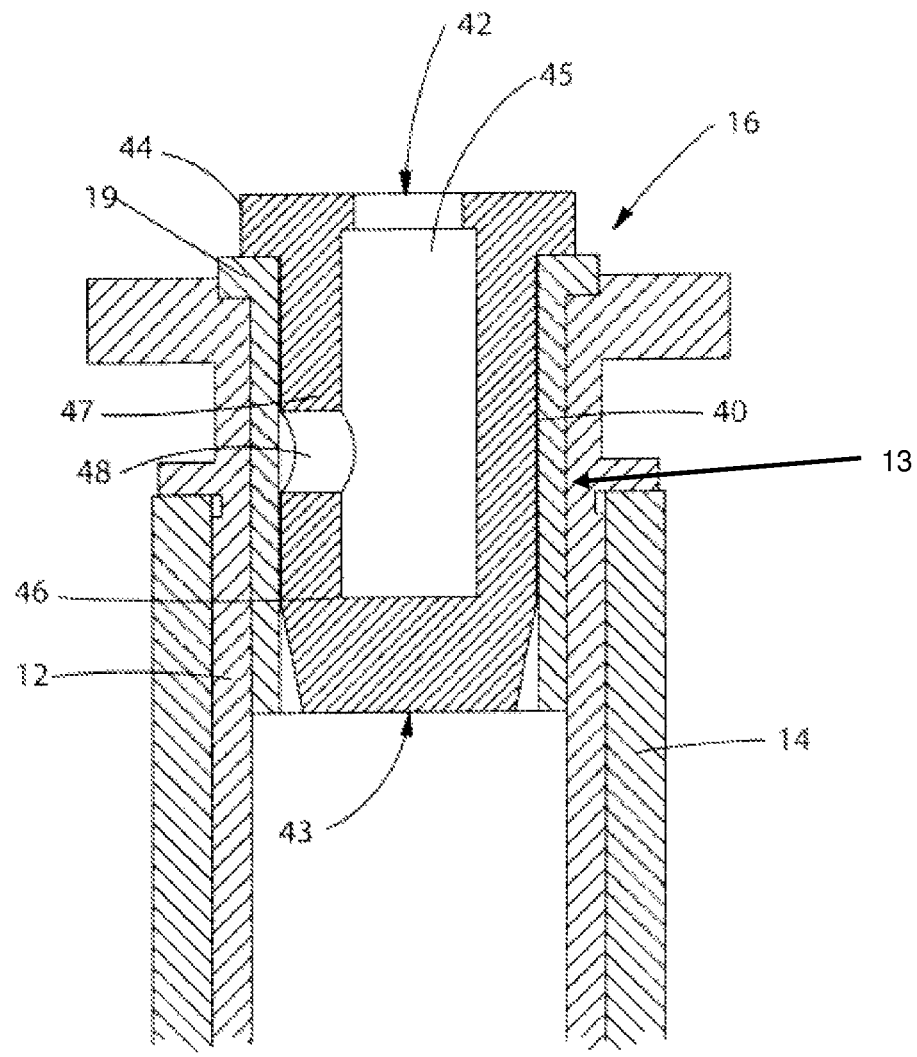
FIG. 2 is a partial cross-section view of a valve member inserted into an opening of a container preform.

FIG. 2 shows an exemplary valve member 16 suitable for use herein. The valve member 16 may include an elastically deformable body 40 in cooperation with a rigid insert 19. The elastically deformable body 40 may be made from any suitable elastomeric material commonly known in the art. In certain embodiments, an inner wall of the polymeric preform 14 or the neck region 13 may be used to functionally replace the insert 19. The insert 19 (or alternatively a neck region 13 of the polymeric preform 12) may be configured to function as a sleeve to seal the valve 16 in its normally closed position. The valve body 40 may include an open end 42, an opposing closed end 43, and a flange 44 disposed proximate to the open end 42. In certain embodiments, a blind hole 45 (i.e., a hole that does not extend completely through the valve member 16) extends from the open end 42 and terminates at a blind hole bottom 46. As shown in FIG. 2, the blind hole 45 defines the inner surface of the valve body side wall 47. A through-hole 48 may extend from the inner surface to the outer surface of the side wall 47 (i.e., extends completely through the side wall 47) and is positioned between the open end 42 and the bottom 46 of the blind hole 45. In certain embodiments, the valve 16 may include no blind holes 45 and two or more through holes 47 arranged to provide a flow path. The body 40 and/or through-hole(s) 48 may be arranged to form a seal with the wall of the insert 19. The insert 19 may made from a rigid material such as, for example, plastic, metal, hard elastomers, glass, and cardboard or other cellulosic based materials to provide a desirable sealing surface. The valve member 16 may be actuated by a user, for example, by applying a sufficient amount of axial stress to elastically deform the valve body 40 such that the valve body 40 becomes elongated and its diameter is reduced. A fluid flow channel may then be formed between the exterior surface of body 40 and the insert 19 as the body 40 is elongated and reduced in diameter. The fluid flow channel, once created, permits flowable material to travel into and out of the interior of the preform or bag/container created from the preform. In this example, the flowable composition flows through the through-hole 48, the blind hole 45, and open end 42. The valve 16 is provided with a nozzle opening through which the composition passes as it exits the container. In certain embodiments, the open end 42 may act as the valve nozzle or, alternatively, a separate nozzle may be provided. It is important to provide a nozzle that has an opening(s) that is/are configured to apply the composition to a surface in the form of a suitable film. For example, the nozzle opening may be configured to provide a particular pressure drop (i.e., the difference between the pressure exerted on the composition in the container and the pressure at which it is applied to a surface) and/or shear rate. By selectively configuring the opening, the shear rate, for example, can be controlled to minimize the undesirable effect(s) of shear thickening or shear thinning on the composition. Examples of suitable valve members for use herein are disclosed in co-pending U.S. Ser. No. 12/604,931 filed by Chan, et al., on Oct. 23, 2009.

The collapsible bag 18 may be charged (i.e., filled) with a composition such as one or more of the personal care compositions disclosed herein prior to or subsequent to being joined with the valve member 16. The fluid channel formed in the valve permits the flowable composition to travel into and out of the interior of the preform or bag/container created from the preform. For example, during a blow molding process, axial stress may be applied by pressurized air directed into the blind hole 45 to actuate the valve. During the filling process, the axial stress may be created by charging a pressurized product into the interior of the formed bag. The axial stress may also be created by downward displacement of a tube or rod inserted into blind hole 45 that makes up part of a valve and actuator system. The flowable composition is charged into the bag at a sufficient pressure to expand the bag both radially and axially, which, in turn, causes the elastically deformable band to correspondingly expand both radially and axially. Potential energy is once again created as the elastically deformable band expands. A normally-closed valve such as the valve member described above is fluidly connected with the filled bag and band assembly. The closed valve prevents the potential energy in the elastic band from acting on the filled bag to urge the contents through the valve.

Figure 3:
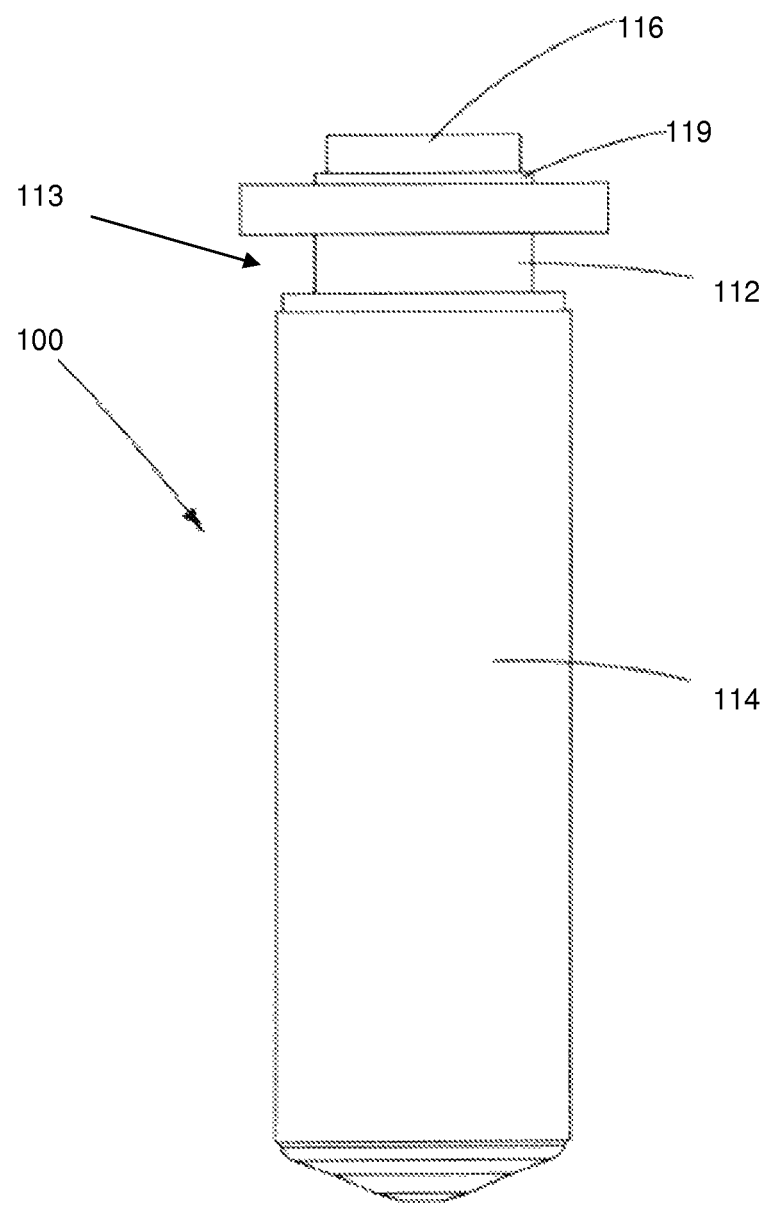
FIG. 3 is a side view of an exemplary container preform.
Figure 4:
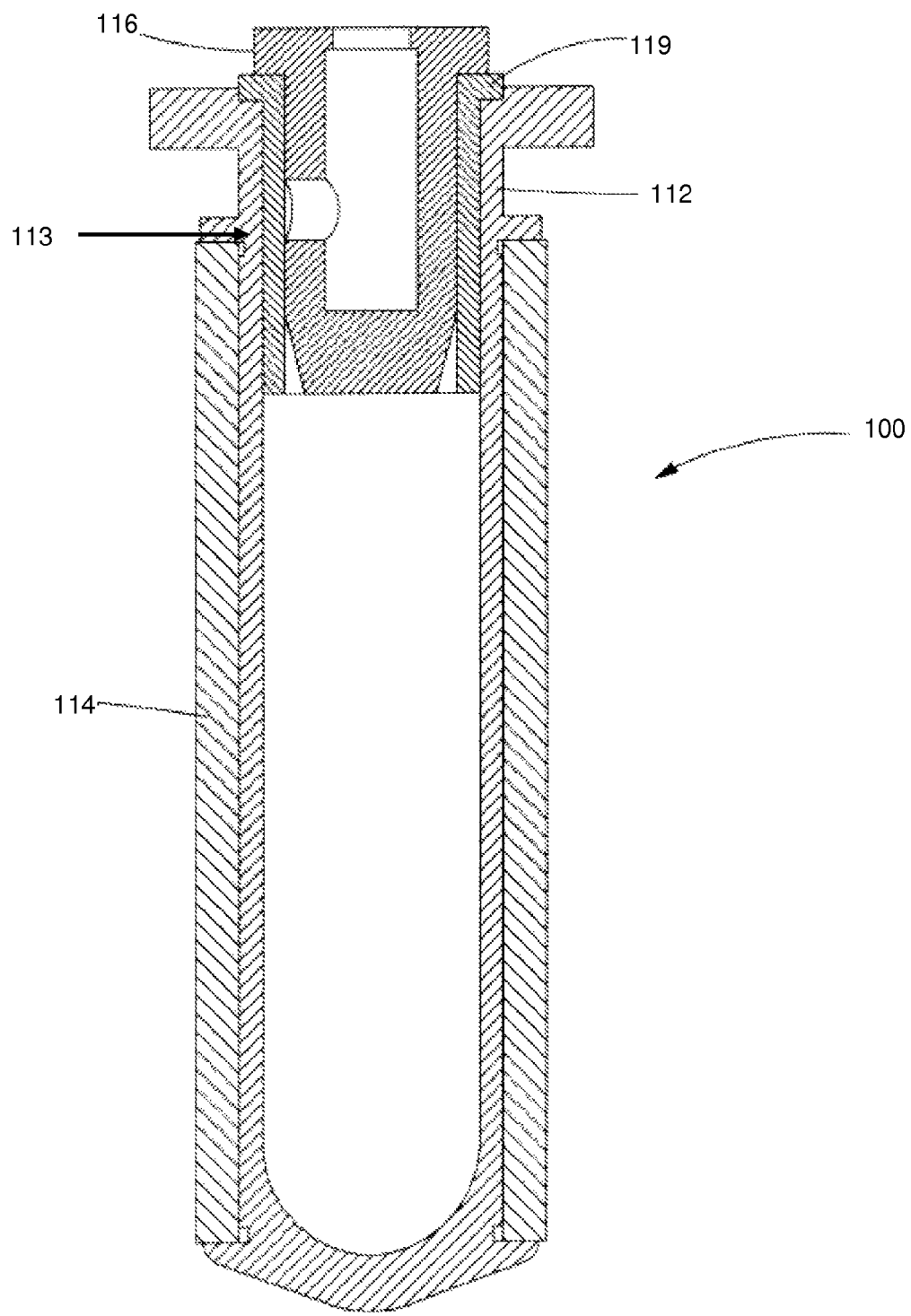
FIG. 4 is a cross-section view of the exemplary container preform shown in FIG. 3.

FIG. 3 shows exemplary embodiment of a container preform 100. The container preform 100 includes a polymeric preform 112, an elastically deformable band 114, valve member 116, and an optional adapter/insert 119 disposed between valve member 116 and a neck region 113 of polymeric preform 112. FIG. 4 shows an axial cross-section view of the container preform 10 of FIG. 3.

Figures 5, 6:
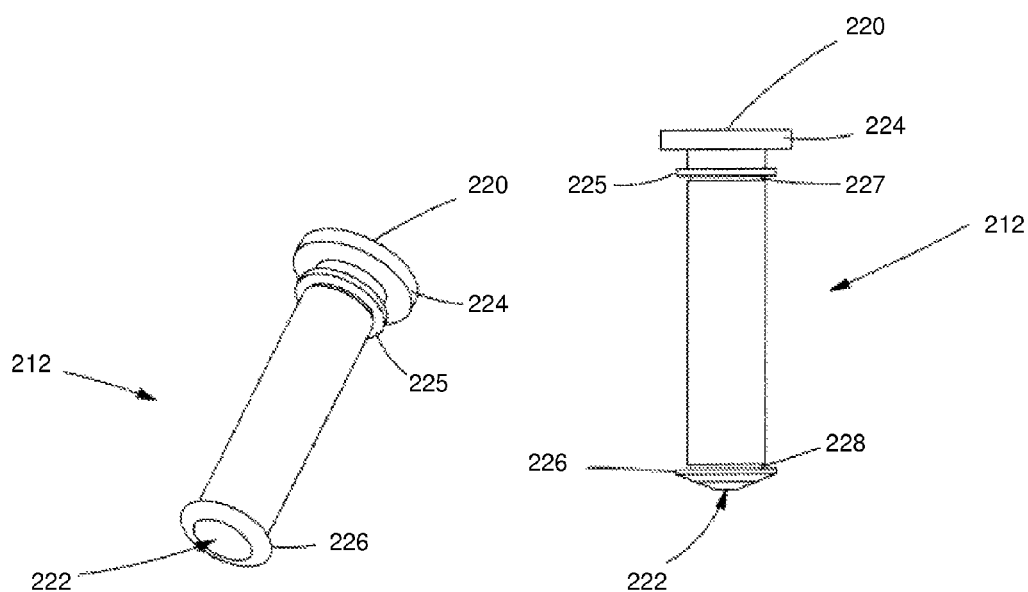
FIG. 5 is a perspective view of an exemplary polymeric preform.
FIG. 6 is a side view of the exemplary polymeric preform shown in FIG. 5.

FIGS. 5 and 6 show an exemplary embodiment of a polymeric preform 212. The polymeric preform 212 includes an open end 220 (although the actual opening is not shown) and an opposing closed end 222. The polymeric preform 212 may include a flange 224 proximate to the open end 220 to help hold the polymeric preform 212 in a particular position in a blow mold. The flange 224 may also be used for joining the expanded polymeric preform 212 to an outer container and/or a portion of a valve or actuator assembly. Additional flanges 225 and 226 and grooves 227 and 228 may be included to help position and retain the elastic band 214 in a variety of configurations, as desired. For example, the elastic band 214 may be joined to the polymeric preform 212 at one or more points proximate to the open end 220 and/or closed end 222. In certain embodiments, an adhesive may be placed in the grooves 227 and/or 228 to affix the elastic band 214 to the polymeric preform 212. The grooves 227 and 228 may be configured for receiving adhesive, but it should be appreciated that the adhesive could also be deposited on the exterior of the polymeric preform 212 in the absence of any specific receiving feature such as the optional grooves 227 and 228. Nonlimiting examples of adhesives suitable for use herein include epoxies, urethanes, acrylates, and/or other adhesives capable of suitably bonding an elastically deformable material with a plastic material. The adhesive may be air-cured, light-cured, and/or cured via chemical cross-linking. Particularly suitable examples of adhesives for use herein are LOCTITE 4306 and 4307 brand light-cured adhesives and LOCTITE 406, 4501, and 495 brand adhesives, all available from Henkel, located in Germany. In certain embodiments, the elastic band 214 is not affixed to the polymeric preform 212 at points which are positioned away from the ends 220 and 222 of the polymeric preform 212 (i.e., points that are spaced significantly from the open end 220 and the closed end 222) so that the polymeric preform 212 walls may expand to the blow mold boundary as effectively and efficiently possible without being constrained by the elastic band 214. Mechanical means may also be employed to join the elastic band 214 to polymeric preform 212. Alternatively or additionally, the elastic band 214 may be configured such that it is unnecessary to affix the distal portion of the band to the polymeric preform 212.

Figure 7:
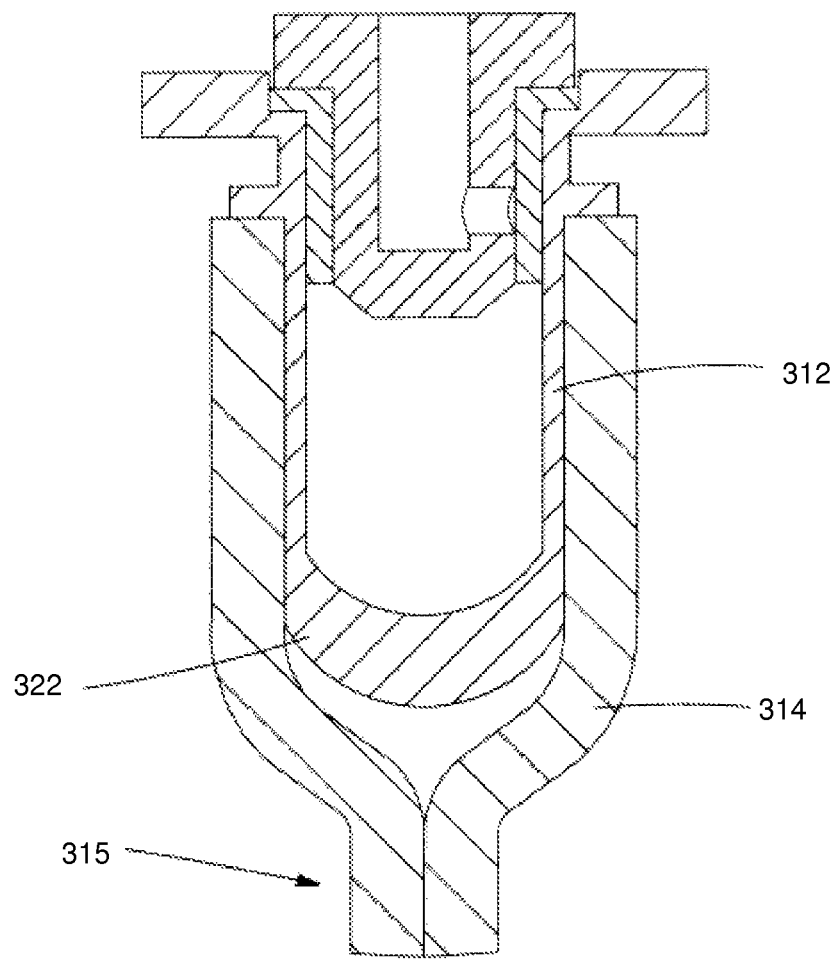
FIG. 7 is a cross-sectional view of an exemplary embodiment of a container preform.

FIG. 7 shows an exemplary embodiment wherein the elastic band 314 has a distal end 315 that is closed over the closed end 322 of the polymeric preform 312. When the polymeric preform 312 expands axially, for example, during blow molding, the elastic band 314 can correspondingly stretch in the axial direction. The closed distal end 315 may be formed by adhesively adhering inner wall portions of the elastic band 314 to one another. Alternatively or additionally, a restraining member (e.g., a clamp) may be placed around the exterior of the distal end 315 to hold it closed. Although the distal end 315 is shown completely closed, it may also be partially closed or be manufactured to have a smaller opening than its opposing side so that the polymeric preform 312, and any collapsible bag that may be blow molded from the polymeric preform 312, do not push through the distal end 315 of the elastic band 314.

Figure 8:
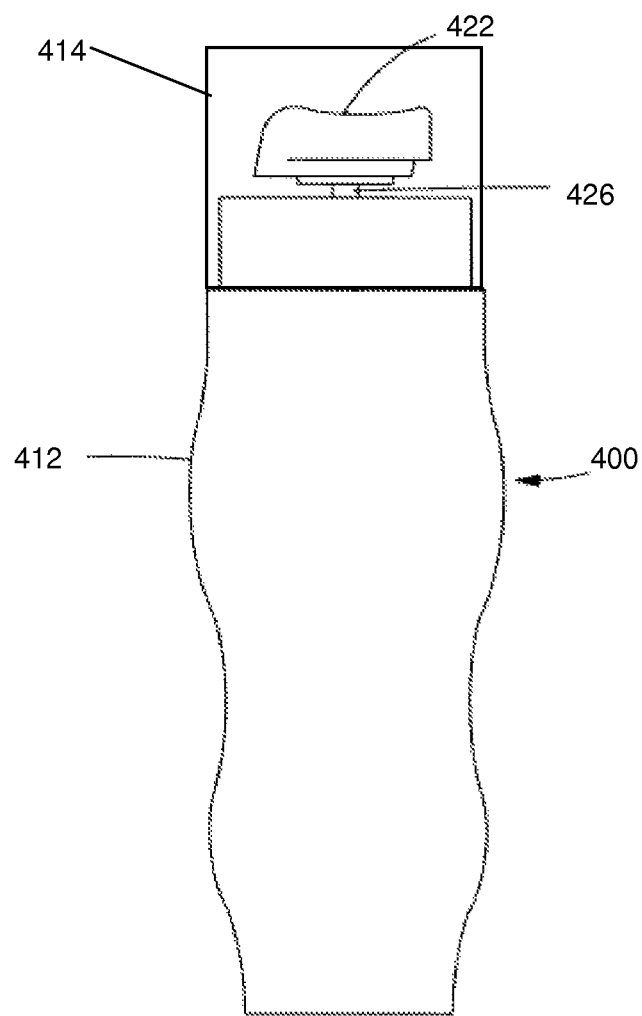
FIG. 8 is a side view of a personal care product.
Figure 9:
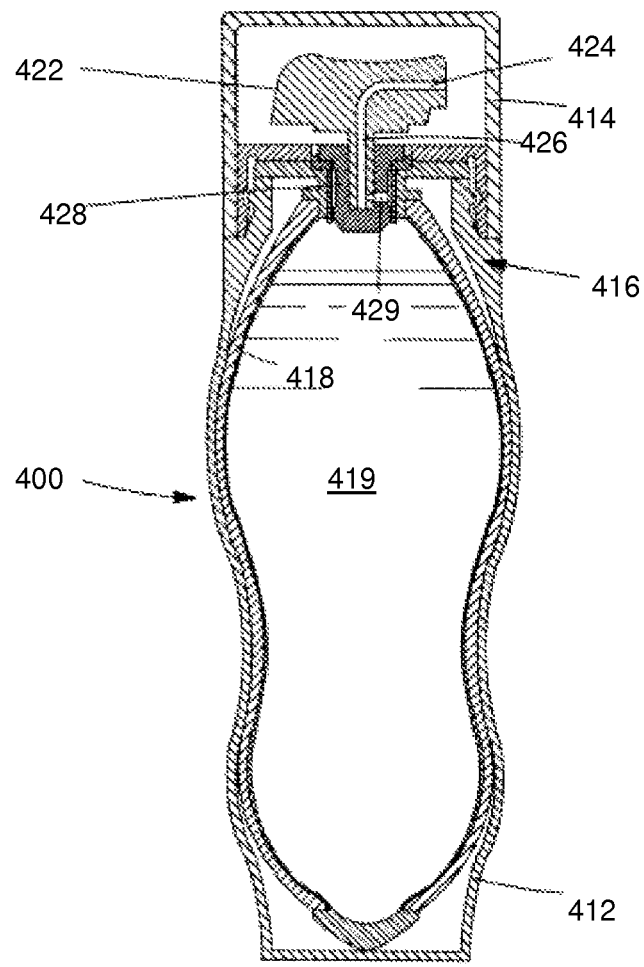
FIG. 9 is a cross-section view of the personal care product of FIG. 8.
Figure 10A:
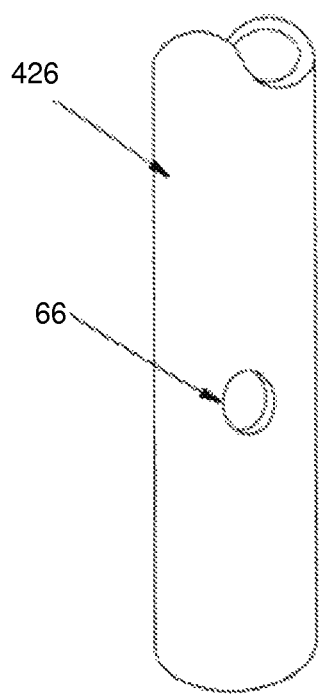
FIGS. 10A and 10B are side views of two exemplary tubes.
Figure 10B:
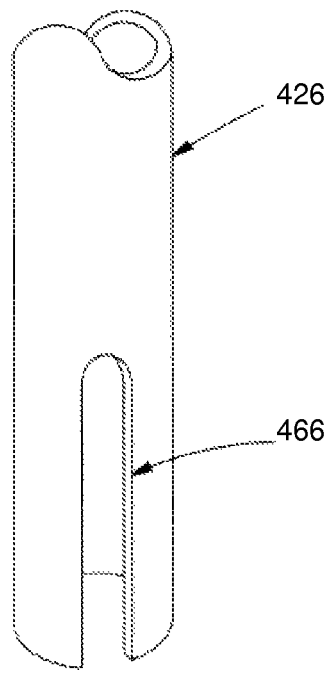

An exemplary personal care product 400 is shown in FIG. 8. FIG. 9 shows an axial cross-section view of the personal care product 400 of FIG. 8. The personal care product 400 includes a shaped container 412 and overcap 414. The overcap 414 shown in FIG. 8 is transparent, but it is to be appreciated that the overcap 414 may be translucent or even opaque. A material dispensing system 416 is disposed within container 412, which includes a collapsible bag 418 formed from a polymeric preform such as one of the polymeric preforms disclosed herein. The collapsible bag 418 is filled with a flowable personal care composition 419. An actuator 422 is positioned on container 412 and includes a flow path defined at least partially by a tube 426. The tube 426 may be connected to an elastically deformable valve member 428. Downward displacement of tube 426 positions valve member 428 such that a volume of the personal care composition 419 is capable of passing into the through-hole 429, which may be aligned with a second through-hole and/or an open-ended slot (e.g., FIG. 10A shows a second through-hole 66 on tube 426 and FIG. 10B shows an open-ended slot 466 on tube 426) on tube 426, such that the personal care composition 419 is capable of flowing through the length of the tube 426 and exiting the package 410. In certain embodiments, the tube 426 may rotatable within the valve member 428 such that in one position a first through-hole 66 is aligned with a second through-hole 429 and in another position it is not. This feature may provide a desirable locking aspect to prevent or limit the discharge of composition 419 if the actuator is inadvertently hit or pressed.

FIG. 11 shows an exemplary embodiment of an outer container 500 suitable for use herein. The outer container 500 may include an opening 590 at the top of the container for inserting a polymeric preform, collapsible bag, and/or valve member. The outer container 500 may be made of any suitable material known in the art. In certain embodiments, the outer container 500 may be formed from the same material as the polymeric preform. In certain embodiments, the outer container may be made simultaneously with the tube in sleeve dispenser described hereinabove. For example, a container preform having an inner container preform, an outer container preform, and an elastically deformable member disposed between the two preforms may be used in a blow molding process. All three structures expand to the mold cavity wall with use of pressurized air and/or a push rod. In one embodiment, where a push rod is used in an Injection Stress Blow Molding (ISBM) process, the valve is installed after the ISBM process. Installing the valve after the ISBM method allows the push rod to push through the preform open end 20. Upon removing the internal pressure applied to the container preform, the elastically deformable member contracts and collapses the inner container formed from the inner container preform, while an outer container formed from the outer container preform substantially maintains the geometry defined by the blow mold cavity. It may be desirable to provide an opening or a gap between the outer container and the elastically deformable member to help break any negative pressure generated during the process. The inner and outer container preforms may be made from the same polymeric material or different materials (e.g., having different thermal transition temperature such as Melt temperatures or Glass Transition temperature).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for making a personal care product, the method comprising:
    (a) providing a mold suitable for forming a container during a blow mold process;
    (b) placing a container preform in the mold, the container preform comprising
        (i) an extensible polymeric preform and
        (ii) an elastic member surrounding at least a portion of the polymeric preform, the elastic member being stretchable axially and radially and being constructed of an elastically extensible material that permits the transfer of infrared radiation through at least a portion of the elastic member;
    (c) heating the container preform with infrared radiation to at least the glass transition temperature of the polymeric preform;
    (d) expanding the polymeric preform during a blow molding process to form a collapsible bag comprising an internal storage space suitable for receiving a personal care composition, whereupon expanding the polymeric preform causes the elastic member to be stretched axially and radially thereby generating potential energy;
    (e) permitting the elastic member to contract axially and radially to collapse the collapsible bag;
    (f) providing an actuatable valve member for opening and closing a flow path from the collapsible bag to an external environment;
    (g) charging the collapsed bag with a personal care composition; and
    (h) wherein the personal care composition includes a skin care composition comprising an active ingredient selected from the group consisting of zinc oxide, petrolatum, white petrolatum, mineral oil, cod liver oil, lanolin, dimethicone, hard fat, vitamin A, allantoin, calamine, kaolin, glycerin, and colloidal oatmeal, and combinations of these.

2. The method of claim 1, wherein the container preform further comprises an outer container preform.

3. The method of claim 2, wherein the outer container preform is formed from the same material as the polymeric preform.

4. The method of claim 1, wherein the container preform is heated to a temperature of between 0.5° C. and 15° C. above the glass transition temperature of the polymeric preform.

5. The method of claim 1, wherein the personal care composition has a viscosity of 50 and 5000 cP when measured at 22° C. with a DV-III+Rheometer using a RV#3 spindle rotating at 30 RPM.

6. The method of claim 1, wherein the elastic member, when relaxed, has a wall thickness of between 1 millimeter and 10 millimeters.

7. The method of claim 1, wherein the personal care composition has a surface tension of between 30 and 56 mN/m.

8. The method of claim 1, wherein the elastic member is stretched such that it exerts a hydrostatic pressure of between 135 and 480 kilopascals on the collapsible bag.

9. The method of claim 1, wherein the personal care product is capable of dispensing at least 95% of the personal care composition before the supply of the personal care composition is operatively exhausted.

10. The method of claim 1, wherein the collapsible bag comprises at least one section having a wall thickness of less than about 100 micrometers.

11. The method of claim 1, wherein the collapsible bag has a bag open end and an opposing bag closed end, the elastic member comprising a first end proximate the bag open end and a second end joined to the bag proximate to the bag closed end.

12. The method of claim 1, wherein the elastic member is joined to the collapsible bag by at least one of an adhesive, a mechanical fastener, or a combination thereof.

13. The method of claim 1, wherein the elastic member is stretched axially between 50% and 750% of its relaxed length when the collapsed bag is charged with the personal care composition.

14. The method of claim 1, wherein the valve member includes at least one of a through and a blind hole.

15. The method of claim 14, wherein the valve member includes a through hole and a blind hole configured to provide the flow path through the valve member.

16. The method of claim 1, wherein the valve member includes a rigid insert and a flexible body operatively configured to open the flow path when an axial stress is applied to the valve member and close the flow path when the axial stress is removed.

17. A method for making a personal care product, the method comprising:
 (a) providing a mold suitable for forming a container during a blow mold process;
 (b) placing a container preform in the mold, the container preform comprising
  (i) an extensible polymeric preform and
  (ii) an elastic member surrounding at least a portion of the polymeric preform, the elastic member being stretchable axially and radially and being constructed of an elastically extensible material that permits the transfer of infrared radiation through at least a portion of the elastic member;
 (c) heating the container preform with infrared radiation to at least the glass transition temperature of the polymeric preform;
 (d) expanding the polymeric preform during a blow molding process to form a collapsible bag comprising an internal storage space suitable for receiving a personal care composition, whereupon expanding the polymeric preform causes the elastic member to be stretched axially and radially thereby generating potential energy;
 (e) permitting the elastic member to contract axially and radially to collapse the collapsible bag;
 (f) providing an actuatable valve member for opening and closing a flow path from the collapsible bag to an external environment; and
 (g) charging the collapsed bag with a personal care composition; and
 (h) wherein the personal care composition includes an antifungal composition comprising an active ingredient selected from the group consisting of natamycin, rimocidin, nystatin, amphotericin B, candicin, hamycin, imidazoles, triazoles, thiazoles, allylamines, echinocandins, benzoic acid in combination with a keratolytic agent, ciclopirox olamine, tolnaftate, undecylenic acid, flucytosine, griseofulvin, haloprogin, and effective combinations of these.

18. A method for making a personal care product, the method comprising:
 (a) providing a mold suitable for forming a container during a blow mold process;
 (b) placing a container preform in the mold, the container preform comprising
  (i) an extensible polymeric preform and
  (ii) an elastic member surrounding at least a portion of the polymeric preform, the elastic member being stretchable axially and radially and being constructed of an elastically extensible material that permits the transfer of infrared radiation through at least a portion of the elastic member;
 (c) heating the container preform with infrared radiation to at least the glass transition temperature of the polymeric preform;
 (d) expanding the polymeric preform during a blow molding process to form a collapsible bag comprising an internal storage space suitable for receiving a personal care composition, whereupon expanding the polymeric preform causes the elastic member to be stretched axially and radially thereby generating potential energy;
 (e) permitting the elastic member to contract axially and radially to collapse the collapsible bag;
 (f) providing an actuatable valve member for opening and closing a flow path from the collapsible bag to an external environment; and
 (g) charging the collapsed bag with a personal care composition; and
 (h) wherein the personal care composition includes an enzyme inhibiting composition comprising an active ingredient selected from the group consisting of hexamidine; triacetin; water soluble lipase inhibitors in the form of metallic salts; chelating agents that restrict the availability of protease cofactors; esters of fatty alcohols; saturated, unsaturated, linear, or branched zinc salts of a fatty acid of from 12 to 24 carbon atoms; aminated acylated acids; and effective combinations of these.

* * * * *